No. 12,699. REISSUED OCT. 1, 1907.

I. WROBLEWSKI.

CASEMENT WINDOW.

APPLICATION FILED NOV. 21, 1906.

2 SHEETS—SHEET 1.

Attest:
A. L. O'Brien

Inventor:
Ignacy Wroblewski
by Dickerson, Brown, Raegener & Binney Attys.

THE NORRIS PETERS CO., WASHINGTON, D. C.

No. 12,699. REISSUED OCT. 1, 1907.

I. WROBLEWSKI.

CASEMENT WINDOW.

APPLICATION FILED NOV. 21, 1906.

2 SHEETS—SHEET 2.

Attest:

A. L. O'Brien

Inventor:

Ignacy Wroblewski by Dickerson, Brown, Raegener & Binney Attys.

THE NORRIS PETERS CO., WASHINGTON, D. C.

UNITED STATES PATENT OFFICE.

IGNACY WROBLEWSKI, OF KRAKOW, AUSTRIA-HUNGARY.

CASEMENT-WINDOW.

No. 12,699. Specification of Reissued Letters Patent. Reissued Oct. 1, 1907.

Original No. 780,696, dated January 24, 1905, Serial No. 141,635. Application for reissue filed November 21, 1906. Serial No. 344,361.

*To all whom it may concern:*

Be it known that I, IGNACY WROBLEWSKI, a subject of the Emperor of Austria, and a resident of Krakow, Province of Galicia, Austria-Hungary, have invented certain new and useful Improvements in Casement-Windows, of which the following is a specification accompanied by drawings.

This invention relates to improvements in French or casement windows, more particularly to that class of French windows which open inwardly, and the objects of the invention are to render such inwardly opening windows water tight and practically air tight so that neither water nor dust can pass through the joints.

Other objects of the invention are to enable one wing of a double window to be opened by itself while the other remains locked, and to further enable the window to be locked so that it cannot be opened from the outside.

The invention is equally applicable to doors, which may be locked at night or whenever desired and left free to be swung open and closed at other times.

Figure 1:
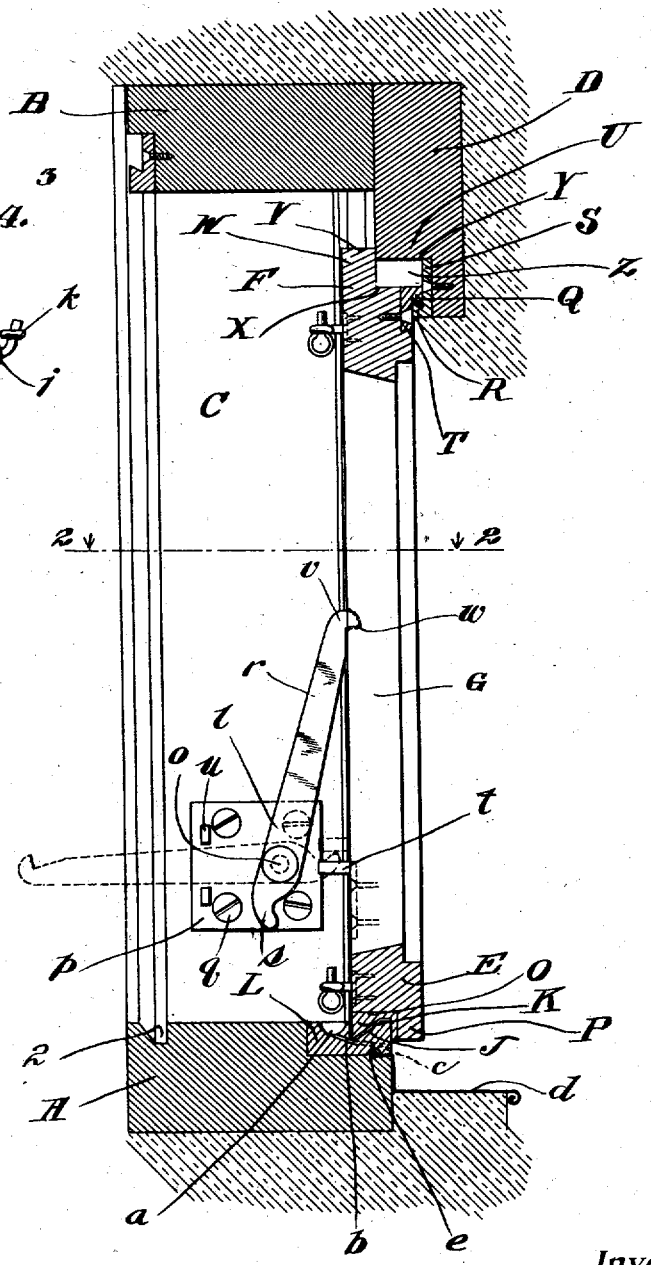
Figure 4:
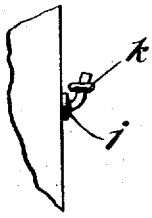
Figure 2:
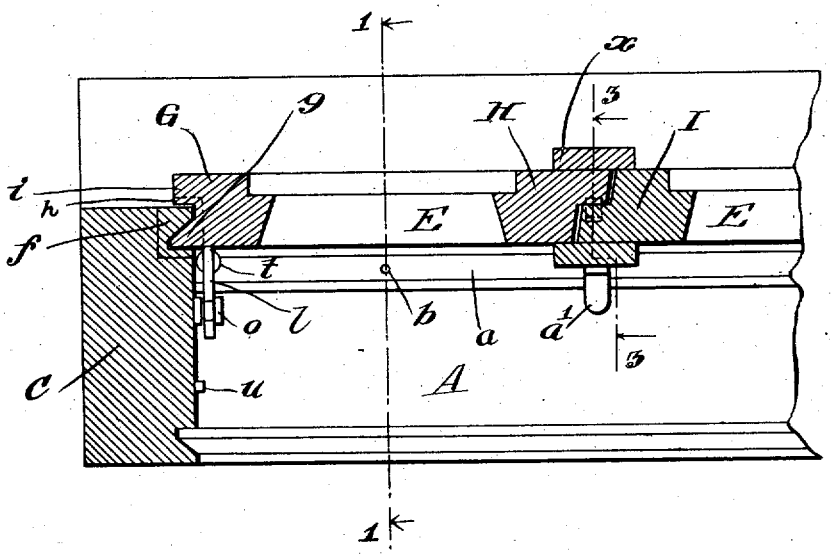
Figure 3:
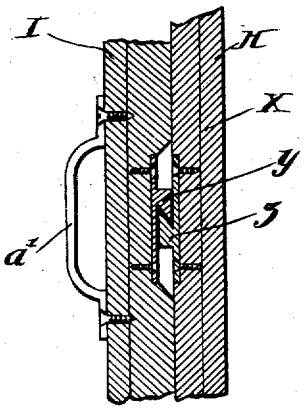

Further objects of the invention will hereinafter appear and to these ends the invention consists of a French or casement window for carrying out the above objects embodying the features of construction, combinations of elements and arrangement of parts having the general mode of operation substantially as hereinafter fully described and claimed in this specification and shown in the accompanying drawings, in which, Figure 1 is a vertical sectional elevation of a window embodying the invention on line 1—1 of Fig. 2, looking in the direction of the arrows; Fig. 2 is a horizontal sectional view, partly broken away, on the line 2—2 of Fig. 1, looking in the direction of the arrows; Fig. 3 is a detail vertical sectional view, partly broken away, through the meeting rails of the sashes on the line 3—3 of Fig. 2, looking in the direction of the arrows; Fig. 4 is a detail side view of one of the pivots for the window.

In the class of windows to which this invention belongs the window sash is adapted to be raised from its seat on the window sill and then swung open inwardly. The window may be either single or double, and the construction applies equally well to large or small windows, or to doors. When the sash is in its lowered position it is locked against swinging movement, and means are provided for raising and lowering the sash or sashes and for locking them so that they cannot be opened from the outside. Means are also provided for insuring a tight joint between the sash and the window casement at all points, and a tight joint is insured between the meeting sash rails in the case of a double window. Provision is also afforded for draining off the condensed moisture which accumulates on the inside of the window panes.

Referring to the drawings, A represents the bottom rail of the frame or window sill, B represents the top rail of the frame, and C one of the side rails of the frame. At the top of the casement or embrasure is provided an outer top rail D arranged outside of the frame B and adapted to coöperate with the window sash or sashes.

The lower sash rail E and the upper sash rail F are adapted to interlock respectively with the window sill A and the outer top rail D, while the side sash rails G are adapted to interlock with the upright side rails C of the frame, thereby forming a tight joint around the window casement. Interlocking connections are also provided between the meeting sash rails H and I to form a tight joint.

The window sill A and lower sash rail E in this instance are provided with interlocking grooves and ribs or projections extending across the width of the window, and preferably the window sill A is provided with a groove J, while the lower sash rail E is provided with a rib K adapted to enter the groove J and form a tight joint. In this instance the sill A is provided with a metallic strip L extending across the window in which the groove J is formed, while the sash E is provided with a coöperating metallic strip O having the rib K, and these metallic strips may be of zinc or any other suitable metal, but the invention is not to be understood as limited to metallic strips extending along the sill and sash, for the coöperating groove and rib may be formed in any other suitable manner or of any other suitable material. Preferably the window sash E extends downwardly in front of the upper portion of the sill A or strip L as at P to insure a tight joint to prevent the entrance of water, air and dust from the outside.

The upper sash rail F and the outer rail D are also provided with interlocking tongues and grooves in any suitable manner, in this instance the sash being provided with a downwardly extending tongue or rib Q, which interlocks with an upwardly extending tongue or rib R on the rail D, each tongue or rib extending across the width of the window. As shown in the drawings, these interlocking connections are formed by metallic strips S and T, but the invention is not limited to said strips. These strips engage each other hook fashion and each is substantially in the form of a hook. The hook formed by the strip S, as shown, extends upwardly, while the hook formed by the strip Q extends downwardly, so that an interlocking connection is formed when the sash E is lowered into the groove J. Preferably the hooks or tongues Q and R are provided with inclined meeting faces which engage each other when the window is in lowered position. In order to enable the window to be raised sufficiently to free the interlocking connections at top and bottom and permit the window to be opened, sufficient space is provided between the upper portions U and V of the upper sash rail F and the top rail D, and frame B to permit the desired vertical movement. As shown, the upper sash rail F is provided with the upwardly extending projection W which slides along the inner face of the outer rail D and overlaps the same to insure a tight joint. A convenient construction for the upper sash rail F and rail D is shown in Fig. 1, in which the sash is recessed at X and the rail D is recessed at Y to afford a clearance space Z between said recesses.

In order to drain off condensed moisture which collects on the inside of the window panes a groove *a* is provided in the sill A or strip L extending the width of the frame inside of the sash, and connecting channels or outlets *b* and *c* extending downwardly and outwardly connect the groove *a* with the outside of the frame, whereby the water collecting in the groove *a* may drain off. Preferably the channels *b* and *c* are out of line with each other to prevent the entrance of air. The passages *b*, as shown, communicate with the bottom of the groove J as do the passages *c*, so that any water which may enter from the outside and collect in the groove J will drain off. In this instance a metallic angle plate *d* is provided to catch the drip from the channel *c*. As shown, this angle plate *d* extends partially under the strip L, then downwardly along the outer upright surface of the window sill and outwardly over the masonry of the casement, forming a drip plate. The inner edge of the angle plate *d* may be locked between the strip L and the sill A, and for this purpose the strip L is grooved at *e* to receive the enlarged or curled end of the angle plate *d*.

The side frame C and side sash rails G are provided with coöperating grooves and tongues or ribs, in this instance the side frame C having grooved metallic strips *f*, into which extends the tongues *g* on the metallic strips *h* on the sashes, and these strips extend throughout the height of the sashes and frames. Preferably also the side sashes G overlap the outside faces of the side frame C as at *i* to insure a tight joint.

The window sashes are pivoted to swing open and shut in any suitable manner, in this instance the side frames being provided with upwardly extending hooks *j* over which are placed the eyes *k* connected to the window sashes. Preferably the shanks of the pivotal hooks *j* extend outwardly from the side frames at an angle so that as the sash is lowered into locking position, it is drawn against the side frame, thereby drawing the rib *g* into its coöperating groove in the side frame to make a tight joint.

In order to raise and lower the window sash or sashes a lever *l* is suitably pivoted to one of the side frames. In this instance the lever being pivoted at *o* on a plate *p* secured to the side frame C in any suitable manner as by means of the screws *q*. The lever *l* is preferably provided with a long arm *r* and a short arm *s* which may be in the form of a hook. The short arm *s* is adapted to coöperate with a projection *t* on the window sash. When the lever *l* is moved into the dotted position shown in Fig. 1 the shorter arm *s* is moved upwardly under the projection *t* on the sash, thereby raising the sash to permit the window to be swung on its pivots. The lever *l* may be moved slightly longitudinally on its pivot pin *o* to permit the longer arm of the lever to be moved under a stop or projection *u* on the side frame C and thereby maintain the sash in raised position. When the sash or sashes have been lowered into locking position as shown in Fig. 1 the lever *l* may be moved into the upright position shown in solid lines, and in order to prevent the sashes from being opened from the outside the lever is provided with a hook *v* on its upper end adapted to engage a recess *w* in the sash and thereby prevent the sash from being raised from the outside.

In order to insure a tight joint between the meeting sash rails H and I an outside overlapping vertical strip *x* is provided on one of the sashes, and furthermore the meeting faces of the rails H and I are provided with interlocking hooks *y* and *z*, which are adapted to engage each other when the sash or sashes are lowered into locking position and are disengaged when one sash is raised. A handle *a'* may be provided on the inside of one of the meeting sash rails preferably opposite the interlocking hooks *y* and *z*.

In accordance with this invention one wing of a double window may be raised and opened, while the other wing is left in closed position, which is extremely desirable for suitable ventilation under different circumstances. Both sashes may also be raised to permit ventilation under the lower sashes without swinging either sash open. It is understood that in case of double windows or doors each sash or door is provided with a raising and lowering device as illustrated in the drawings. Furthermore double windows or winter windows may be constructed in which both the outer and inner sashes operate upon the principles of this invention. As shown in Fig. 1, the inner sides of the top and bottom rails A and B of the frame are constructed to afford provision for inner sashes. As shown, the window sill A is provided with a groove 2, while the top rail B is provided with a hooked projection 3. The said groove 2 and projection 3 extend across the width of the frame and are adapted to receive the inner sashes of the double window. The embrasure may be otherwise suitably constructed to receive a double window. The material of the window frames and sashes may be of any suitable construction, as for instance, wood or metal, or any other desired material. The window or door construction embodying this invention is also applicable for windows and doors comprising one, two or more parts, and such doors or windows may be applied in any suitable manner either for house construction or for balconies.

Obviously some features of this invention may be used without others and the invention may be embodied in widely varying forms, therefore, without limiting the invention to the devices shown and described, and without enumerating equivalents, I claim and desire to obtain by Letters Patent the following:

1. In a casement-window, the combination with a window-frame, of a window-sash pivotally connected to the window-frame, and adapted for vertical movement, an interlocking connection between a rail of the window-frame and the adjacent rail of the sash and adapted to prevent swinging movement of the sash until the latter has been raised, and a lever having arms of unequal length pivoted to the window-frame, and a projection on the sash adapted to be engaged by the shorter arm of the lever for the purpose set forth.

2. In a casement-window, the combination with a window-frame, of a sash pivotally connected thereto, and adapted for vertical movement, an interlocking connection between the upper and lower rails of the window-frame and the corresponding rails of the sash, a lever having arms of unequal length pivoted to the window-frame, a projection on the sash adapted to be engaged by the shorter arm of the lever, and a projection adapted to be engaged by the longer arm of the lever to hold the same in a position with the sash raised.

3. In a casement-window, the combination with a window-frame, of a sash pivotally connected thereto and adapted for vertical movement, a strip secured to the lower rail of the window-frame, a strip secured to the lower rail of the sash, the said strips being constructed on their opposing faces to provide an interlocking connection for the window frame and sash, the strip on the rail of the window-frame having a trough and channels leading therefrom to the outside as described.

4. In a casement-window, the combination with a window-frame, of two meeting pivoted and vertically movable window-sashes, means for raising and lowering said sashes, a window sill having a groove extending across the width of the same, and the lower rails of the sashes having corresponding tongues or projections adapted to enter said groove in the lowered position of the sashes, the upper rail of the window-frame and the upper rails of the sashes also being provided with interlocking hooked connections extending across the width of the window.

5. In a casement-window, the combination with a window-frame and two meeting pivotally and vertically movable sashes and means for raising and lowering the sashes of tongue and grove connections between the window sill and the lower sash rails, and interlocking hooked connections extending across the width of the sashes between the upper sash rails and the upper rail of the window frame.

6. In a casement-window, the combination with two pivoted and vertically movable wings or window-sashes, of a double window, means for raising and lowering said sashes, and interlocking means on the meeting faces of the meeting rails of the window-sashes for locking said sashes together in closed and lowered position.

7. In a casement-window, the combination with the two pivoted and vertically movable wings or sashes of a double window, of interlocking connections between the meeting faces of the meeting rails of said wings adapted to lock said sash rails together in closed and lowered position.

8. A casement window comprising the frame having top and bottom rails and side rails, a sash pivotally connected to one side rail and adapted for vertical movement, a metallic strip secured to the bottom rail of the frame and provided with a longitudinal locking groove, (and another longitudinal groove forming a drip trough extending substantially parallel to and behind the locking groove, said drip trough communicating with the exterior of the frame by channels extending transversely through the strip, the lower sash rail also being provided with a metallic strip on its lower edge having a tongue adapted to enter the locking groove.

9. A casement window comprising the frame having top and bottom rails and side rails, a sash pivotally connected to one side rail and adapted for vertical movement, a metallic strip secured to the bottom rail and provided with a longitudinal locking groove, the lower sash rail also being provided with a metallic strip having a tongue adapted to enter the locking groove, and a projection on the lower sash rail adapted to extend downwardly in front of the strip on the sill to insure a tight joint to prevent entrance of water and dust from outside.

10. A casement window, comprising a frame having a top rail and an outer top rail having a recess, side rails and bottom rail or sill, a sash pivotally connected to one side rail and adapted for vertical movement, a metal strip secured to the upper sash rail and provided with a downwardly extending tongue or rib, and a metal strip secured in the recess in the outer top rail of the frame and provided with an upwardly extending rib with which the tongue on the sash is adapted to interlock when the sash is in lowered position.

11. A casement window, comprising a frame having a top rail and an outer top rail having a recess, side rails and bottom rail or sill, a sash pivotally connected to one side rail and adapted for vertical movement, the upper sash rail being adapted to move in the recess in the outer top rail of the frame and having an upwardly extending projection in the rear of the outer top rail, the upper sash rail and outer top rail also being provided with interlocking metal strips.

12. A casement window, comprising a frame having a top rail, grooved side and bottom rails, sashes adapted for vertical movement, and having tongues on their lower rails, and outer side rails adapted to coöperate with the grooves on the bottom and sides of the frame, interlocking connections between the top sash rails and the top rail of the frame, upwardly projecting hooked pivots secured to the inside surfaces of the side rails of the frame, and having the shanks of the hooks diverging inwardly from said surfaces, and apertured lugs carried by the sash and engaged over the hooked pivots, whereby the tongues on the outer side rails of the sashes are drawn tightly into the grooves in the side rails of the frame, when the sashes are in lowered position.

In testimony whereof I have signed this specification in the presence of two subscribing witnesses.

IGNACY WROBLEWSKI.

Witnesses:
HANSON C. COXE,
JACK H. BAKER.